United States Patent
Moulinié et al.

(10) Patent No.: US 6,359,069 B1
(45) Date of Patent: Mar. 19, 2002

(54) TRANSPARENT COMPOSITION CONTAINING POLYCARBONATE AND A COPOLYMER OF METHYLMETHACRYLATE

(75) Inventors: Pierre Moulinié, Imperial; Nicanor Köhncke, Pittsburgh, both of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/636,200

(22) Filed: Aug. 10, 2000

(51) Int. Cl.[7] ............................ C08L 69/00; C08L 33/12
(52) U.S. Cl. ...................... 525/148; 526/313; 526/326
(58) Field of Search .......................................... 525/148

(56) References Cited

U.S. PATENT DOCUMENTS

| | | | |
|---|---|---|---|
| 4,319,003 A | 3/1982 | Gardlund | 525/148 |
| 4,743,654 A | 5/1988 | Kyu et al. | 525/148 |
| 4,745,029 A | 5/1988 | Kambour | 428/412 |
| 4,749,749 A | 6/1988 | Munzer et al. | 525/148 |
| 4,906,696 A | 3/1990 | Fischer et al. | 525/148 |
| 5,284,916 A | 2/1994 | Drzewinski | 525/92 |
| 6,111,133 A | * 8/2000 | Houlihan | |

FOREIGN PATENT DOCUMENTS

| | | |
|---|---|---|
| DE | 3833218 | 4/1990 |
| EP | 0 573 109 | 12/1993 |
| GB | 1394481 | 5/1975 |
| JP | 7-216063 | 8/1995 |

* cited by examiner

*Primary Examiner*—David J. Buttner
(74) *Attorney, Agent, or Firm*—Joseph C. Gil; Aron Prefs

(57) ABSTRACT

A thermoplastic molding composition is disclosed containing polycarbonate resin and a copolymer of methyl methacrylate conforming structurally to:

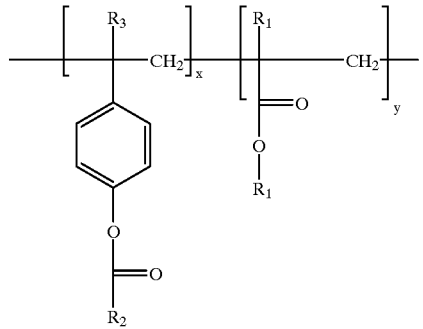

wherein x and y are integers calculated to result in a content of PMMA in the copolymer in the range of 80 to 90 mole %, and where $R_1$ denotes —$CH_3$, $R_2$ denotes —$C_6H_5$ and $R_3$ is a $C_1$–$C_2$-alkyl group. The composition is characterized in its transparence.

5 Claims, No Drawings

TRANSPARENT COMPOSITION CONTAINING POLYCARBONATE AND A COPOLYMER OF METHYLMETHACRYLATE

FIELD OF THE INVENTION

The present invention is directed to a thermoplastic molding composition and more particularly to a transparent blend that contains polycarbonate resin and atactic copolymer of PMMA.

SUMMARY OF THE INVENTION

A thermoplastic molding composition is disclosed containing polycarbonate resin and a copolymer of methyl methacrylate conforming structurally to:

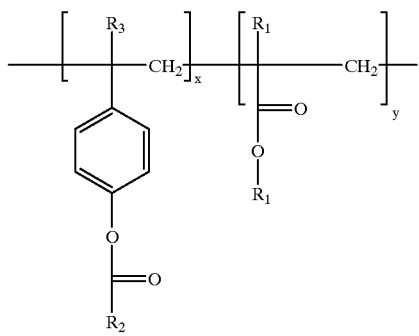

wherein x and y are integers calculated to result in a content of PMMA in the copolymer in the range of 80 to 90 mole %, and where $R_1$ denotes —$CH_3$, $R_2$ denotes —$C_6H_5$ and $R_3$ is a $C_1$–$C_2$-alkyl group.

The composition is useful in preparing transparent articles, including films.

BACKGROUND OF THE INVENTION

Polycarbonate resins are characterized by dimensional stability at relatively high temperatures, excellent resistance to impact, stiffness and transparency. These properties make polycarbonate the material of choice for a variety of applications including glazing containers and medical devices. A notable drawback characterizing this resin has been its susceptibility to scratching. Polymethylmethacrylate ("PMMA"), known for its clarity and scratch resistance is noted for its shortcomings in terms of dimensional stability, low impact strength and relatively poor thermal stability. While some blends of polycarbonates and PMMA reflecting a more attractive profile of properties are known, it is also known that a wide range of blends with typical PMMA are immiscible and opaque. It has been suggested that free radical polymerized PMMA does not form a single thermodynamically miscible transparent blend but does demonstrate mechanical compatibility with polycarbonate. While this compatibility is taken to mean that the phases exhibit good adhesion one to the other, the resulting blend is not transparent.

Literature relative to mixtures of polycarbonate and PMMA include U.S. Pat. No. 4,319,003 that disclosed opaque blends. Also noted in this connection are JP 7216063 and EP 297285. Ways of overcoming the drawbacks associated with the immiscibility of PMMA and polycarbonate have been proposed. These include the addition of copolymer additives (DE 2264268); PMMA/acrylamide copolymers (DE 3632946 and PMMA-ester copolymers containing carboxylic groups (U.S. Pat. No. 4,906,696). Further, transparent blends of PMMA and polycarbonate are said to have been prepared, in accordance with DE 3,833,218, by melting the two components in the presence of supercritical gas. U.S. Pat. Nos. 4,743,654 and 4,745,029 disclosed producing solutions of the two polymers in organic solvents and evaporating the solvents as means to prepare transparent material. Transparent films of polycarbonate and polymethylmethacrylate produced by special solvent-removal methods, however, tend to become opaque at temperatures above 145° C. due to the immiscibility of these polymers. Mixtures of polycarbonate and stereoregular polymethyl methacrylate in which at least 60% of the monomer units are in the syndiotactic configuration have been disclosed in EP 573,109. U.S. Pat. No. 5,284,916 is noted for disclosing a blend of polycarbonate and a block copolymer containing a polyaromatic(alkyl)-methacrylate block.

DETAILED DESCRIPTION OF THE INVENTION

The present invention concerns a thermoplastic molding composition containing polycarbonate and a specifically structured copolymer of methyl methacrylate (herein "COPMA"). The composition, containing about 5 to 20, preferably 7 to 15 percent of a suitable COPMA, the percent being relative to the total weight of polycarbonate and COPMA is characterized by its transparency. The inventive transparent blend may be processed thermoplastically in accordance with conventional procedures and using conventional means.

Aromatic polycarbonates within the scope of the present invention are homopolycarbonates, copolycarbonates, branched polycarbonates and mixtures thereof. The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964 (all incorporated herein by reference).

In the present context, dihydroxy compounds suitable for the preparation of the polycarbonates of the invention conform to the structural formulae (1) or (2):

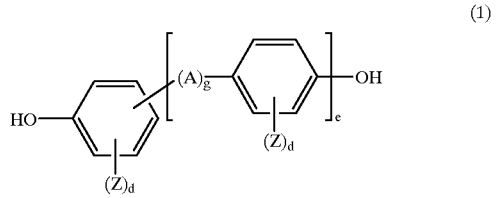

-continued

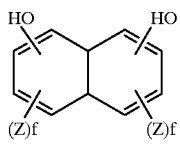
(2)

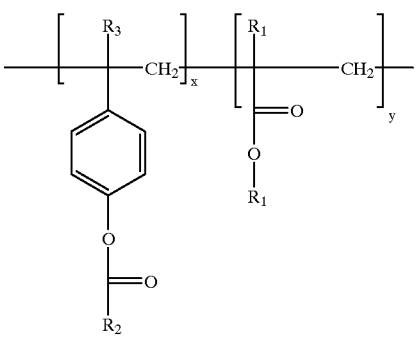

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to:

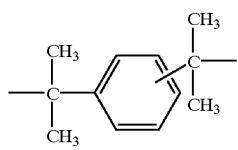

e and g both denote the number 0 to 1; Z denotes F, Cl, Br or $C_1$–$C_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclearalkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro4-hydroxyphenyl)-propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl4-hydroxyphenyl)-p-diisopropylbenzene, 2,2,4-trimethyl cyclohexyl 1,1-diphenol and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane, 2,2,4-trimethyl cyclohexyl 1,1-diphenol and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

The copolymer of methyl methacrylate of the present invention (herein COPMA), conforms structurally to:

wherein x and y are integers calculated to result in a content of PMMA in the copolymer in the range of about 80 to 90 mole %, $R_1$ denotes —$CH_3$, $R_2$ denotes —$C_6H_5$ and $R_3$ is hydrogen or a $C_1$–$C_2$-alkyl group.

The preparation of the inventive COPMA may be carried out by free radical polymerization of methyl methacrylate in the presence of an appropriate vinyl-benzoate comonomer. Suitable benzoate monomer may be synthesized from α-methyl-para-hydroxystyrene with benzoyl chloride in the presence of an amine base (such as triethylamine). In the course of the work leading to the present invention, 4-phenol ispropenylbenzoate was thus prepared.

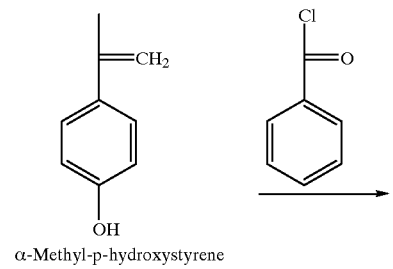

α-Methyl-p-hydroxystyrene

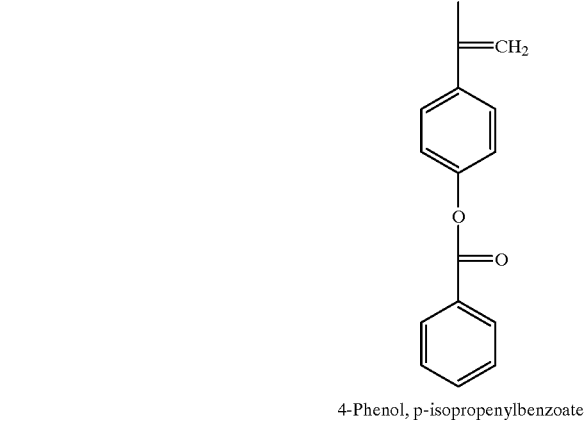

4-Phenol, p-isopropenylbenzoate

The invention is further illustrated but is not intended to be limited by the following examples in which all parts and percentages are by weight unless otherwise specified.

EXAMPLES

1. Methylmethacrylate and toluene were mixed with the 4-phenol p-isopropenylbenzoate prepared in accordance with the procedure above. The amount of 4-phenol p-isopropenylbenzoate is calculated to yield COPMA having 80 to 95 mol % of PMMA. Polymerization was initiated with about 0.5% of azobisisobutyronitrile, a free radical initiator. The polymerizations were allowed to proceed at 25 to 60° C. with stirring until such time as a viscous solution was obtained.

2. The resulting COPMA is isolated, such as by precipitation in methanol, and dried in a vacuum oven at 80° C. Characterized by spectroscopy and measurements of glass transition temperatures, the resulting COPMA had glass transition temperatures (shown below) that are higher than that of PMMA (=125° C.).

| MMA content (%) | Tg (° C.) |
|---|---|
| 95 | 132 |
| 90 | 130 |
| 80 | 135 |

3. Blends in accordance with the invention were prepared and their properties were determined. The polycarbonate component of all the exemplified blends was a homopolycarbonate based on bisphenol A (Makrolon 2608, a product of Bayer Corporation). In preparing the blends, a low shear melt kneader was used, operating at 280° C. for 20 to 25 minutes. Additional inventive blends were prepared in a 16 mm twin-screw extruder which has conveying and mixing sections along the extruder screws at 250 to 285° C. No catalysts or other additives are necessary for preparing the transparent materials. The blends contained 90 wt. % polycarbonate and 10 wt % COPMA (the COPMA containing 90 mole % MMA). These were injection molded conventionally to make test specimens for determination of optical properties (see results below in Table 2).

4. A comparative example containing 90 wt % polycarbonate and 10 wt % PMMA were prepared by the same procedures and optical properties (total light transmission —TLT— and haze) of specimens thus molded were determined (in accordance with ASTM D 1003). These are reported below (see Table 2).

TABLE 2

| | TLT (%) | Haze (%) |
|---|---|---|
| Inventive blend | 79 | 7.24 |
| Comparative blend | 19.5 | 99.3 |

Clearly, the composition in accordance with the invention exhibit far better optical properties than does a corresponding, largely similar composition.

5. Corresponding blends containing the indicated amounts of polycarbonate resin and copolymers having molecular structures similar to COPMA were prepared as described below. The structures of the various copolymers and the relevant properties of the resulting compositions are noted below.

(a) A copolymer conforming structurally to:

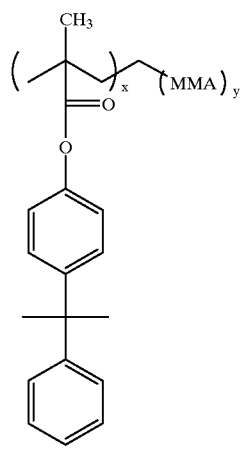

wherein MMA denotes units derived from methylmethacrylate comonomer and wherein x amounted to 10 mole % relative to the molar amount of the copolymer was blended with polycarbonate. The resulting blend (10 percent by weight (wt. %) of copolymer and 90 wt % of polycarbonate) was opaque.

(b) A copolymer conforming structurally to:

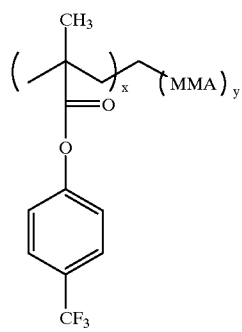

wherein x amounted to 10 mole % relative to the molar amount of the copolymer was blended with polycarbonate. The resulting blend (10 wt.% of copolymer and 90 wt % of polycarbonate) was opaque.

(c) A copolymer conforming structurally to:

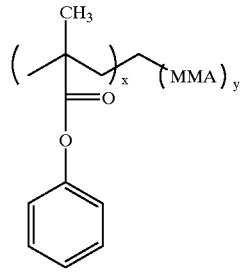

wherein x amounted to 10 mole % relative to the molar amount of the copolymer was blended with polycarbonate. The resulting blend (10 wt. % of copolymer and 90 wt % of polycarbonate) was opaque.

(d) A copolymer conforming structurally to:

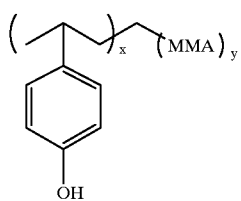

where x amounted to 50 mole % relative to the molar amount of the copolymer, a product of Aldrich proved to be immiscible with polycarbonate.

(e) A copolymer conforming structurally to:

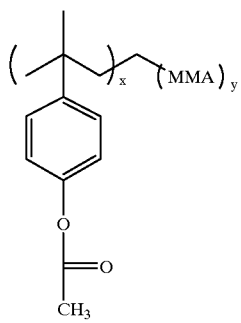

(i) where x amounted to 10 mole %: a blend of 10 wt % copolymer and 90 wt % polycarbonate was opaque.
(ii) where x amounted to 20 mole %: a blend of 10 wt % copolymer and 90 wt % polycarbonate was opaque.
(iii) where x amounted to 10 mole %: a blend of 5 wt % copolymer and 95 wt % polycarbonate was opaque.

6. The copolymer of the invention —COPMA conforming to:

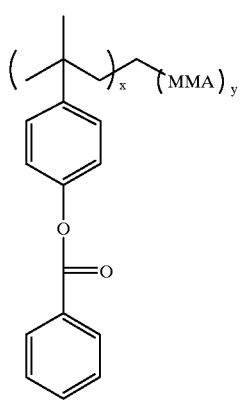

(i) where x amounted to 10 mole %: a blend containing 90 wt % polycarbonate resin was transparent (ii) where x amounted to 10 mole %: a blend containing 93 wt % polycarbonate resin was transparent (iii) where x amounted to 10 mole %: a blend containing 70 wt % polycarbonate resin was opaque.

(iv) where x amounted to 20 mole %: a blend containing 90 wt % polycarbonate resin was transparent.

(v) where x amounted to more than 20 mole %: a blend containing 90 wt. % polycarbonate was opaque.

Although the invention has been described in detailed in the foregoing for the purpose of illustration, it is to be understand that such detail is solely for that purpose and that variations can be made therein by those skilled in the art without departing from the spirit and scope of the invention except as it may be limited by the claims.

What is claimed is:

1. A transparent thermoplastic molding composition comprising polycarbonate resin and a copolymer of methyl methacrylate conforming structurally to:

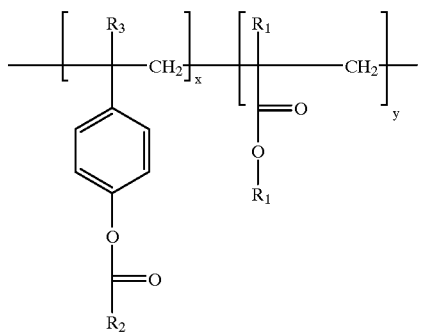

wherein x and y are integers calculated to result in a content of PMMA in the copolymer in the range of about 80 to 90 mole %, $R_1$ denotes —$CH_3$, $R_2$ denotes —$C_6H_5$ and $R_3$ is hydrogen or a $C_1$–$C_2$-alkyl group.

2. The composition of claim 1 wherein polycarbonate is present in an amount of 5 to 20 percent relative to the total weight of polycarbonate and said copolymer.

3. The composition of claim 1 wherein polycarbonate is present in an amount of 7 to 15 percent relative to the total weight of polycarbonate and said copolymer.

4. The composition of claim 1 wherein $R_3$ is hydrogen.

5. The composition of claim 2 wherein $R_3$ is hydrogen.

* * * * *